G. N. CURBEY.
VALVE.
APPLICATION FILED MAR. 11, 1911.

1,001,510.

Patented Aug. 22, 1911.

Witnesses
Chas. L. Griesbauer.
L. G. Ellis.

Inventor
G. N. Curbey,
By Watson E. Coleman
Attorney

UNITED STATES PATENT OFFICE.

GEORGE NELSON CURBEY, OF SAGINAW, MICHIGAN.

VALVE.

1,001,510.  Specification of Letters Patent.  Patented Aug. 22, 1911.

Application filed March 11, 1911. Serial No. 613,732.

*To all whom it may concern:*

Be it known that I, GEORGE NELSON CURBEY, a citizen of the United States, residing at Saginaw, West Side, in the county of Saginaw and State of Michigan, have invented certain new and useful Improvements in Valves, of which the following is a specification, reference being had to the accompanying drawings.

This invention is an improved check valve adapted for use in the flow pipe of a hot water or steam heating system, or in other connections, for automatically cutting off the supply of steam or hot water to a device such as a radiator when the flow from the main to the radiator occasioned by variations of the difference in pressure between the inlet and outlet becomes excessive and to automatically open when the difference in pressure becomes normal, the invention consisting in the construction, combination and arrangement of devices hereinafter described and claimed.

Figure 1:
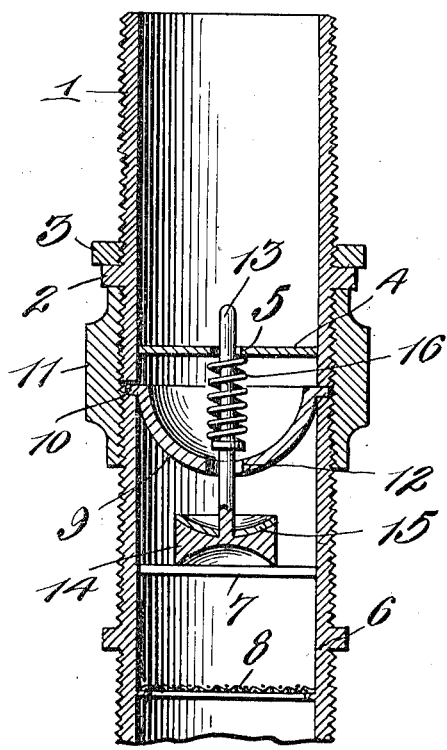
Figure 2:
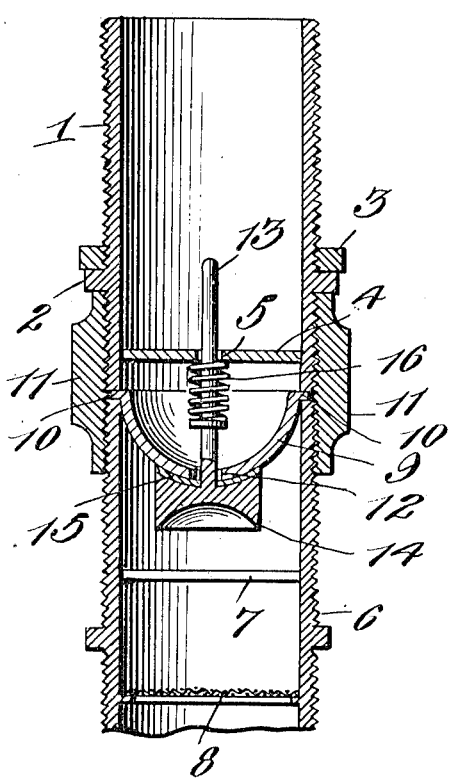

In the accompanying drawings—Figure 1 is a sectional view of a valve constructed in accordance with my invention, showing the same in normal open position. Fig. 2 is a similar view showing the same closed.

In accordance with my invention, I provide a discharge nipple 1, which has a shoulder 2, spaced from its lower end. The upper end of the nipple may be screwed into a pipe or into a radiator or other device, to be supplied with fluid such as steam, or hot water under pressure, and the said nipple is provided with a nut 3 to prevent leakage at the joint between the nipple and the device to which it is connected. This nipple is provided near its lower end with a cross bar 4, which has a central opening 5.

A lower, intake nipple 6, which is here shown as, and is preferably of the same diameter, as the upper nipple, is also provided near its lower end with a cross bar 7, and has at its lower end a strainer 8, made of wire gauze or other suitable foraminous material.

A cup-shaped diaphragm 9 is provided with an annular circumferential flange 10 which is engaged between the ends of the nipple. The nipples are connected together by a sleeve 11, into which their opposing ends are screwed. The diaphragm is provided with a central opening 12. This opening and the opening 5 of the cross bar 4, form guides for a valve rod 13, the valve 14 being at the lower end of the rod, and operating between the bottom of the diaphragm, and the cross bar 7.

The diameter of the opening 12 exceeds that of the valve rod 13. The valve may be suitably formed in its upper side to form a ground joint with the bottom of the cup-shaped diaphragm when the valve is closed, or it may as here shown, be provided on its upper side with a packing gasket 15. I do not limit myself in this particular.

A coiled extensile spring 16 is placed on the valve rod, extends through without closing the opening 12, and bears between the cross bar 4 and the upper side of the valve, the spring normally holding the valve in lower, open position, but permitting the valve to yield to pressure from below, and to close against the bottom of the diaphragm 9, when the flow becomes excessive so as to cut off further flow of the fluid through the device. When the pressure is reduced, and becomes again normal, the spring serves to reopen the valve as will be understood. The cross bar 7 forms a stop to limit the downward movement of the valve, and the strainer 8 prevents the valve from becoming clogged.

The parts of the device may be readily disassembled by merely unscrewing one or both of the nipples from the coupling sleeve.

While I have herein shown and described what I now regard a preferred embodiment of my invention, I would have it understood that minor changes in the form, proportion and construction of the several parts, may be made without departing from the spirit of my invention and within the scope of the appended claims.

I claim:—

1. The herein described valve comprising an intake nipple and a discharge nipple arranged end to end, said discharge nipple being provided with a cross bar having a centrally disposed opening, a cup shaped diaphragm having a peripheral flange disposed between the opposing ends of the nipples, the convex face of the diaphragm projecting into the intake nipple and said diaphragm being provided with a central opening, a valve in the intake nipple having a stem extending through the openings of the diaphragm and the cross bar, the opening in the diaphragm being larger than the stem so that the latter does not entirely fill said opening and the said valve being fitted on one side to close against the convex face of the diaphragm, a spring on the stem and bearing against the stem and the cross bar to normally hold the valve in opened position and a coupling sleeve detachably securing the opposing ends of the nipples together and also detachably securing the flanged diaphragm between the ends of the nipples.

2. The herein described valve comprising an intake nipple and a discharge nipple arranged end to end, said discharge nipple being provided with a cross bar having a centrally disposed opening, a cup shaped diaphragm having a peripheral flange disposed between the opposing ends of the nipples, the convex face of the diaphragm projecting into the intake nipple and said diaphragm being provided with a central opening, a valve in the intake nipple having a stem extending through the openings of the diaphragm and the cross bar, the opening in the diaphragm being larger than the stem so that the latter does not entirely fill said opening and the said valve being fitted on one side to close against the convex face of the diaphragm, a spring on the stem and bearing against the stem and the cross bar to normally hold the valve in opened position and a coupling sleeve detachably securing the opposing ends of the nipples together and also detachably securing the flanged diaphragm between the ends of the nipples, and a stop device in the intake nipple to limit the movement of the valve by the action of the spring.

In testimony whereof I hereunto affix my signature in the presence of two witnesses.

GEORGE NELSON CURBEY.

Witnesses:
JOHN CHISHOLM,
JULIUS BECKMANN.